(12) United States Patent
Hagelin et al.

(10) Patent No.: US 6,386,716 B2
(45) Date of Patent: *May 14, 2002

(54) OPTICAL MIRROR SYSTEM WITH MULTI-AXIS ROTATIONAL CONTROL

(75) Inventors: Paul Merritt Hagelin, Saratoga; John J. Fling, Little River, both of CA (US)

(73) Assignee: C Speed Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,025

(22) Filed: Jun. 11, 2001

Related U.S. Application Data

(63) Continuation of application No. 09/549,778, filed on Apr. 14, 2000, now Pat. No. 6,283,601.

(51) Int. Cl.[7] .............................................. G02B 7/182
(52) U.S. Cl. ...................... 359/871; 359/872; 359/220; 359/221
(58) Field of Search .............................. 359/871, 872, 359/220, 221–226, 298, 291, 292, 847, 846, 849, 855, 198; 310/306, 309, 307; 318/117

(56) References Cited

U.S. PATENT DOCUMENTS

| | | | | |
|---|---|---|---|---|
| 5,673,139 A | * | 9/1997 | Johnson | 359/291 |
| 5,862,003 A | * | 1/1999 | Saif et al. | 359/871 |
| 6,040,935 A | * | 3/2000 | Michalicek | 359/198 |
| 6,137,206 A | * | 10/2000 | Hill | 310/306 |
| 6,215,921 B1 | * | 4/2001 | Lin | 385/18 |

* cited by examiner

Primary Examiner—Mohammad Sikder
(74) Attorney, Agent, or Firm—Sawyer Law Group LLP

(57) ABSTRACT

An optical mirror system with multi-axis rotational control is disclosed. The mirror system includes an optical surface assembly, and at least one leg assembly coupled to the optical surface assembly. The at least one leg assembly supports the optical surface above a substrate. A system and method in accordance with the present invention can operate with many different actuator mechanisms, including but not limited to, electrostatic, thermal, piezoelectric, and magnetic. An optical mirror system in accordance with the present invention accommodates large mirrors and rotation angles. Scanning mirrors can be made with this technique using standard surface-micromachining processes, or a deep RIE etch process. A device in accordance with the present invention meets the requirements for a directly scalable, high port count optical switch, utilizing a two mirror per optical I/O port configuration. An optical mirror in accordance with the present invention can be utilized in, but is not limited to, the following applications: optical add-drop multiplexers, wavelength routers, free-space optical interconnects, chip-level optical I/O, optical scanning displays, optical scanner (bar-codes, micro cameras), optical storage read/write heads, laser printers, medical replacement for glasses (incorporated with adaptive optics), medical diagnostic equipment, optical scanning for security applications.

26 Claims, 2 Drawing Sheets

OPTICAL MIRROR SYSTEM WITH MULTI-AXIS ROTATIONAL CONTROL

CROSS-REFERENCE TO RELATED APPLICATIONS

This application is a Continuation of U.S. patent application Ser. No. 09/549,778, entitled, "Optical Mirror System with Multi-Axis Rotational Control, filed on Apr. 14, 2000, now U.S. Pat. No. 6,283,601.

FIELD OF THE INVENTION

The present invention relates generally to a Microelectromechanical System (MEMS) fabricated optical mirror system that is capable of being tilted on two orthogonal axes, by means of electrostatically driven comb drives. Particular application to the use of these mirrors in the deflection of optical space beams is emphasized.

BACKGROUND OF THE INVENTION

Fiber optic communication systems currently employ electro-optic switching systems to route signals at central office switching centers. These electro-optic systems rely on converting the light output from each "incoming" fiber into electrical form, extracting the data content in the resultant electrical signal, then utilizing conventional electrical switches to route the data content to a modulatable optical source that is coupled to a "destination" optical fiber. This detection switching remodulation process is expensive, complex, power consuming, and subject to component failure.

Alternate "All Optical" switching systems, employing mechanically actuated bulk optic and MEMS fabricated devices currently exist. These devices utilize electromagnetic, piezoelectric and electrostatic actuators to physically move prisms, mirrors and portions of optical fibers to affect switching of signals between optical fibers.

In addition fiber-to-fiber switches employing Grating Waveguides, Rowland Circle Gratings, and planar gratings, permit dedicated switching based on optical wavelength.

Cascaded binary tree configurations, employing switchable optical couplers using electrostatically variable index material, (Lithium Niobate and polymers), as well as Mach Zender interferometers utilizing thermoelectric heaters to affect unbalance, are also currently state of the art.

Many of the MEMS switches employ a space-beam deflection system similar to the electrical "Cross Bar" switch common in telephone system. This approach requires that the number of mirrors for a given input/output port count be determined by the square of the port count figure. The overwhelming number of mirrors dictated by this approach exceeds that which can be produced with any realistic process yield, and survive any reasonable operating period.

Except for some of the MEMS electrostatically actuated devices, none of the above methods of optical switching meets the requirements currently being specified for high fiber port count, (up two 1024 by 1024) Optical Cross Connect switches. Problems of cost, reliability, insertion loss, polarization sensitivity, isolation, wavelength dependence, power consumption, and in some instances, switching speed, either individually or collectively mitigate against their use. Accordingly, what is needed is a system and method for overcoming the above-identified issues under the constraint of a simple CMOS-compatible fabrication process.

An optical mirror system design is desired that has high-resolution 2-D scanning capability and deflection capability, made with a surface-micromachining process. In order to achieve high-resolution, large mirror size and rotation angles are necessary.

The present invention addresses such a need.

SUMMARY OF THE INVENTION

An optical mirror system with multi-axis rotational control is disclosed. The mirror system includes an optical surface assembly, and at least one leg assembly coupled to the optical surface assembly. The at least one leg assembly supports the optical surface above a substrate. A system and method in accordance with the present invention can operate with many different actuator mechanisms, including but not limited to, electrostatic, thermal, piezoelectric, and magnetic. An optical mirror system in accordance with the present invention accommodates large mirrors and rotation angles. Scanning mirrors can be made with this technique using standard surface-micromachining processes, or a deep RIE etch process.

A device in accordance with the present invention meets the requirements for a directly scalable, high port count optical switch, utilizing a two mirror per optical I/O port configuration. An optical mirror in accordance with the present invention can be utilized in, but is not limited to, the following applications: optical add-drop multiplexers, wavelength routers, free-space optical interconnects, chip-level optical I/O, optical scanning displays, optical scanner (bar-codes, micro cameras), optical storage read/write heads, laser printers, medical replacement for glasses (incorporated with adaptive optics), medical diagnostic equipment, optical scanning for security applications.

DETAILED DESCRIPTION

The present invention relates to an optical mirror and more particularly to an optical mirror system with a multi-axis rotational control. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
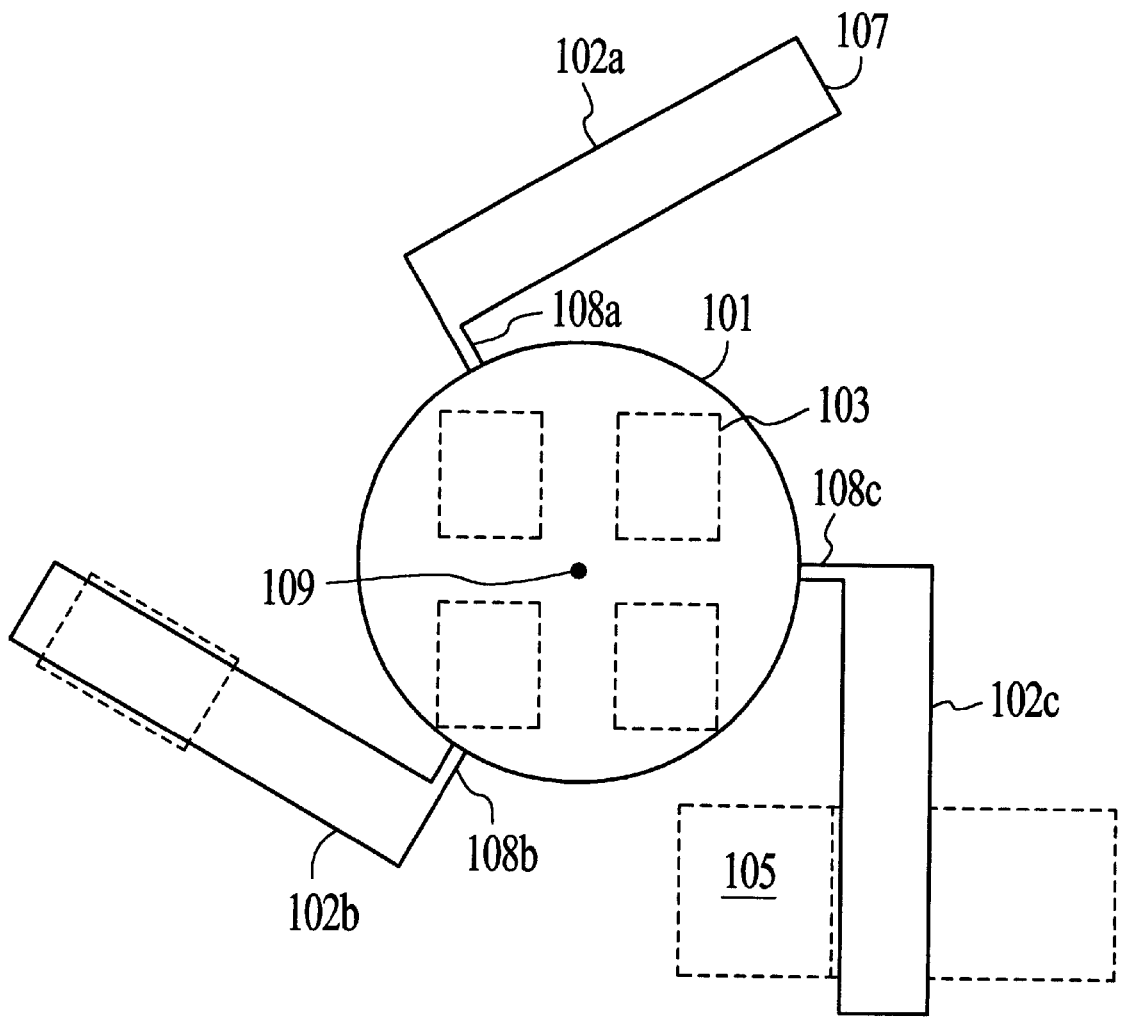
FIG. 1 illustrates an optical mirror system in accordance with the present invention.

FIG. 1 illustrates an optical mirror system in accordance with the present invention. In a preferred embodiment, the optical mirror system 100 in accordance with the present invention includes a plurality of support legs 102a–102c coupled to a support plate 101, via a plurality of connectors 108. The support plate 101 is coupled to an optical surface 103 through a via 109.

Figure 2:
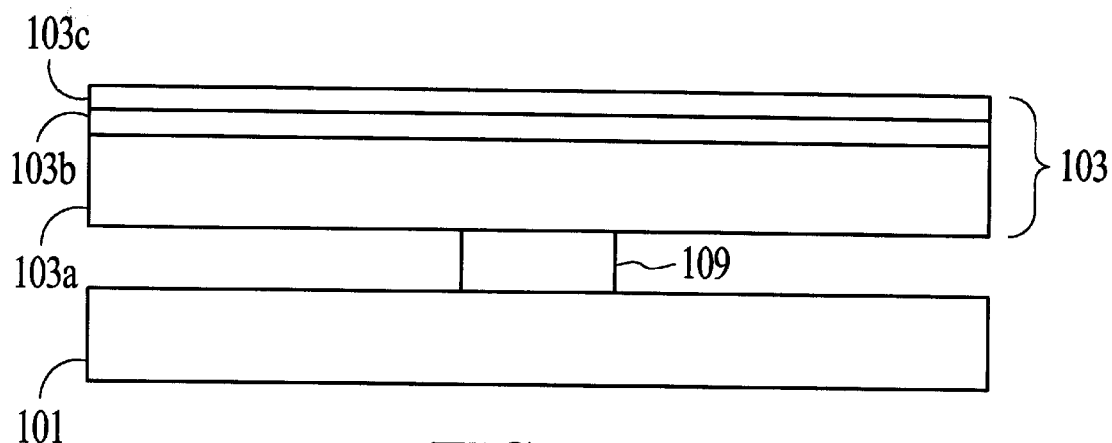
FIG. 2 illustrates a side view of a preferred embodiment of the optical surface and support plate in accordance with the present invention.

FIG. 2 illustrates a side view of a preferred embodiment of the optical surface 103 and support plate 101 in accordance with the present invention. The optical surface 103 is comprised of three laminated layers 103a–103c. Layer 103a is the support layer which can be made of polysilicon. The reflective layer 103b (typically a thin metal) has thermal coefficient (TCE) much greater than the layer 103a, causing unwanted curvature of the optical surface in response to temperature variation. A third layer 103c can be added "on top" or "beneath" the reflective layer 103b having TCE lower than both the other layers. The TCE/thickness of this third layer 103c is selected to control the temperature-induced curvature.

Preferably oxide is utilized for the third layer 103c. However, materials other than "oxide" could be used for the third layer 103, provided their TCEs match the needed parameters.

The mirror substrate is connected to the support plate 101 through a via 109. The support plate 101 provides a mechanical attachment point for the actuators, isolating the optical surface 103 from the distorting micromechanical forces of the actuators. Supporting the optical surface 103 with a single, central connection results in symmetric mechanical boundary conditions. Any shallow curvature induced in the optical surface 103 by thermal or intrinsic stresses will result in a parabolic deformation of the optical surface 103, which can be corrected with spherical optics. In addition, the support plate 101 provides extra surface area for increased heat dissipation from the optical surface 103, resulting in greater optical power handling capability.

Figure 3:
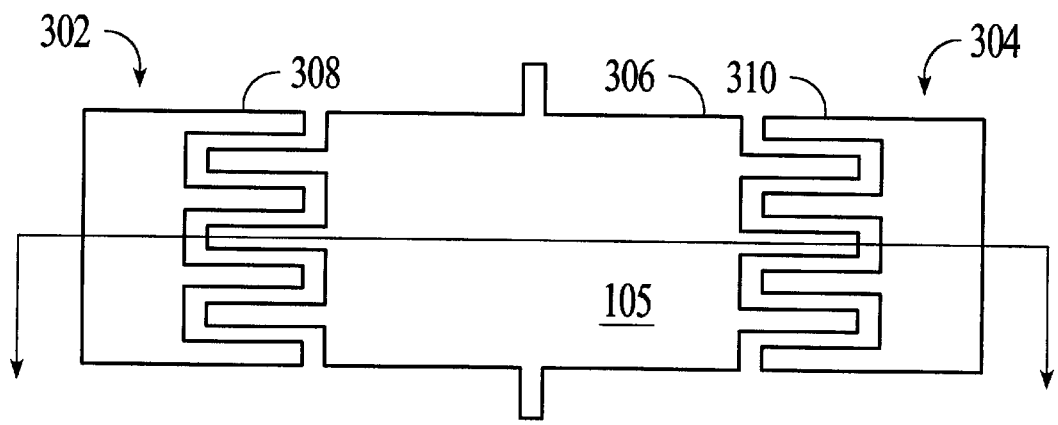
FIG. 3 illustrates a top view of a vertical comb drive actuator in accordance with the present invention.
Figure 4:
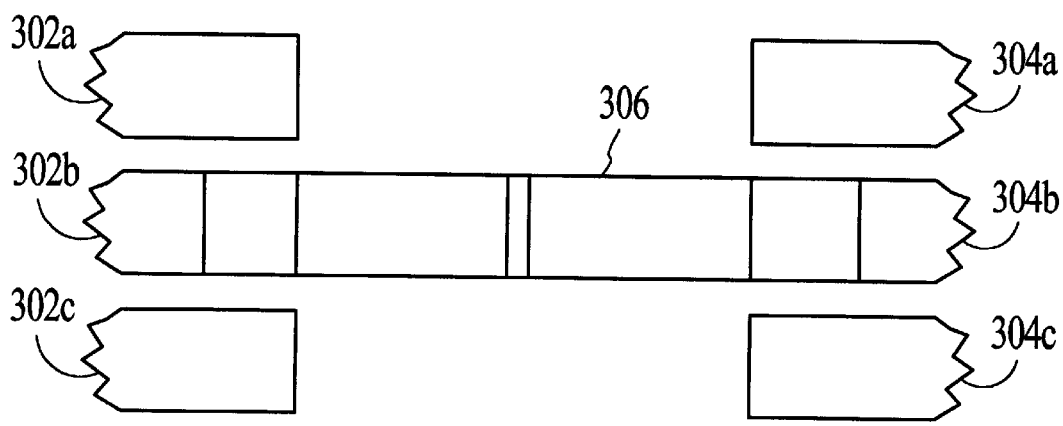
FIG. 4 illustrates a side view of the vertical comb drive actuator of FIG. 3.

Each of the connectors 108a–108c (FIG. 1) are coupled to an actuator 105. FIG. 3 illustrates a top view of a vertical comb drive actuator in accordance with the present invention. FIG. 4 illustrates a side view of the vertical comb drive actuator of FIG. 3. In this embodiment, there are three portions to the actuator system 105, first end portion 302, second end portion 304 and a middle portion 306. The end portions 302 and 304 engage the middle portion 306 through interdigitated teeth 308 and 310. In this embodiment, each of the end portions 302 and 304 comprise three electrically isolated actuators 302a–302c and 304a–304c, respectively.

Accordingly, if actuators 302a and 304a are activated, the system 105 pulls "up". If actuators 302b and 304b are activated the system 105 holds the current position and if actuators 302c and 304c are activated the system 105 pulls down. Accordingly, the actuator system 105 can move the mirror in various ways dependent upon the voltages applied to the motors 302a–302c and 304a–304c. Although this actuator system 105 has been described in the context of a three position (up, down and hold position) system, one of ordinary skill in the art readily recognizes that a two position (up or down), (hold position or down), (hold position or up) could be provided by using two actuators rather than the three actuators in the system disclosed herein.

Referring back to FIG. 1, each of the legs 108 is coupled to a substrate by an anchor 107. Although a plurality of legs are shown, one of ordinary skill in the act recognizes there may be as few as one leg and that use would be within the spirit and scope of the present invention.

The optical surface 103 is suspended on a plurality of support legs 102 that lift it above the surface of a chip. The support legs 102 cause the mirror to tilt through a large angle. The tilt-angle is greater than the angle that could be obtained using a standard sacrificial layer (typically 1–3 microns) as separation between the mirror and a substrate.

In a preferred embodiment, the support legs 102 connect tangentially to the side of the mirror. The support legs 102 can be rectangular or in the shape of an arc along the edge of the mirror in the case of a round or elliptical mirror. As the support legs tilt up, the mirror rotates slightly to relieve stress due to small lateral movement in the support legs.

The support legs 102 can be either rigid or flexible. Flexible legs can be used as springs, for the case in which a parallel-plate actuator applies force to the support plate beneath the mirror. By distributing the bending over the length of a flexible support leg, the maximum shear and tensile stresses in the device are reduced, compared to a rigid support leg that concentrates the bending at flexures. Flexible actuators 105 can be driven thermally (preferably by a resistive heater on each support leg) to cause the mirror to tilt.

Rigid support legs can be connected to the actuators 105 near the surface of the chip. As the support leg tilts, powered by an actuator, the attached edge of the mirror can be raised or lowered. An actuator can be incorporated that facilitates differential capacitance sensing.

A system and method in accordance with the present invention can operate with many different actuator mechanisms, including electrostatic, thermal, piezoelectric, magnetic, etc. Among electrostatic actuators, it supports parallel-plate actuation between the mirror or beneath the electrodes. The actuator can act on the support plate beneath the mirror, or it can act on the support legs. In one implementation, by adjusting the coupling of the actuator to the support legs, the maximum rotation angle of the mirror can be traded off against the maximum applied voltage.

An optical mirror system in accordance with the present invention accommodates large mirrors and rotation angles. Scanning mirrors can be made with this technique using any micromachining processes. All-flexure designs of bi-axial scanning mirrors have superior device density, reliability, and repeatability characteristics. The system has the following advantages over conventional optical mirror system architectures.

1. Arbitrary equilibrium: The lengths of the support arms can be changed to adjust the equilibrium position of the mirror. The actuator does not necessarily act directly on the mirror surface (as it would in a parallel-plate design). The equilibrium angle can be changed without a significant change in the performance of the device.

2. Custom processing not necessary: This approach uses standard micromachining processes. Since the mirror is lifted away from the substrate by the support legs, insulation on the frame is not necessary. The only insulator needed is at the substrate. If an insulator in the support legs is possible, then a wider variety of design options are also available.

3. Nested frames and bimorphs dedicated for self-assembly are not necessary: If bimorphs are needed, they can be incorporated into the support legs or elsewhere. By removing nested frames and extraneous bimorphs used in self-assembly, the size of the device is reduced, allowing more space for actuators or a higher density of devices.

4. Pin-and-staple hinges not needed: The support mechanism can be suspended on an all-flexure mounting. The tilt angle of these supports is relatively small (within the shear and torsion limits of a properly designed support leg or hinge), and therefore pin-and-staple hinges are not needed.

5. Mirror curvature symmetric and small: The mirror can be mechanically decoupled from the undesired deformation of the flexure hinges. By connecting the mirror to the support plate with a single via at its center, the mirror flatness is not affected by forces that develop in its suspension. In addition, if there is a stress gradient in the mirror, the symmetric boundary conditions will typically result in a parabolic shape, which can be readily integrated into an optical system using off-the-shelf spherical optics. Non-spherical deformations of the mirror, typically the result of asymmetric boundary conditions, can cause deformations in the mirror that can cause optical loss through a switch. Electrodes directly beneath the mirror need not be used, removing creases that can occur in the optical surface because of conformal deposition over the electrodes.

Although the present invention has been described in accordance with the embodiments shown, one of ordinary skill in the art will readily recognize that there could be variations to the embodiments and those variations would be within the spirit and scope of the present invention. For example, although it is disclosed in the preferred embodiment that the mirror rotates in a first and a second direction, the mirror can rotate in a plurality of directions (i.e. twisting motion) dependent upon the electrostatic forces applied thereto. Accordingly, many modifications may be made by one of ordinary skill in the art without departing from the spirit and scope of the appended claims.

What is claimed is:

1. An optical mirror system comprising:
   an optical surface assembly, the optical surface assembly including a support plate and an optical surface coupled to the support plate;
   a plurality of leg assemblies coupled to the support plate for supporting the optical surface above a substrate, each of the plurality of leg assemblies includes a leg portion and a connector, the connector coupled between the leg portion and the optical surface assembly; an anchor is coupled to the leg portion for coupling the leg portion to the substrate; and
   an actuator coupled to at least one of the leg portions for moving each of the leg portions to allow for rotation and translation of the optical surface.

2. The system of claim 1 wherein the leg portion is coupled to the anchor via flexible beams.

3. The system of claim 1 wherein the actuator comprises parallel plate electrodes.

4. The system of claim 1 wherein the actuator comprises electrostatic drives.

5. The system of claim 1 wherein the leg portion is flexible.

6. The system of claim 1 wherein the connector is flexible.

7. The system of claim 1 wherein the actuator comprises vertical electrostatic drives.

8. An optical mirror system comprising:
   an optical surface;
   a plurality of leg assemblies coupled to the optical surface for supporting the optical surface above a substrate, each of the plurality of leg assemblies includes a rigid leg portion and a connector, the connector coupled between the rigid leg portion and the optical surface;
   a flexible anchor is coupled to the rigid leg portion for coupling the leg portion to the substrate, and
   an actuator coupled to at least one of the leg portions for moving each of the leg portions to allow for rotation of the optical surface.

9. The system of claim 8 wherein the actuator comprises parallel plate electrodes.

10. The system of claim 8 wherein the actuator comprises electrostatic drives.

11. The system of claim 8 wherein the actuator comprises vertical electrostatic drives.

12. An optical mirror system comprising:
    an optical surface assembly, the optical surface assembly including a support plate and an optical surface coupled to the support plate;
    a plurality of leg assemblies coupled to the support plate for supporting the optical surface above a substrate, and each of the plurality of leg assemblies includes a rigid leg portion and a connector, the connector coupled between the rigid leg portion and the optical surface;
    a flexible anchor is coupled to the rigid leg portion for coupling the leg portion to the substrate; and
    an actuator coupled to the optical surface assembly to allow for rotation and translation of the optical surface.

13. The system of claim 12 wherein the actuator comprises parallel plate electrodes.

14. The system of claim 12 wherein the actuator comprises electrostatic drives.

15. The system of claim 12 wherein the actuator comprises vertical electrostatic drives.

16. An optical mirror system comprising:
    an optical surface assembly, the optical surface assembly including a support plate and an optical surface coupled to the support plate;
    a plurality of leg assemblies coupled to the support plate for supporting the optical surface above a substrate, each of the plurality of leg assemblies includes a leg portion and a connector, the connector coupled between the leg portion and the optical surface;
    an anchor is coupled to the leg portion for coupling the leg portion to the substrate;
    a first actuator coupled to at least one of the leg portions for moving the leg portion to allow for rotation and translation of the optical surface; and
    a second actuator system coupled to the optical surface assembly to allow for rotation and translation of the optical surface.

17. The system of claim 16 wherein the leg portion is coupled to the anchor via flexible beams.

18. The system of claim 16 wherein the first actuator and the second actuator system comprises parallel plate electrodes.

19. The system of claim 16 wherein the first actuator and the second actuator system comprises electrostatic drives.

20. The system of claim 16 wherein the leg portion is flexible.

21. The system of claim 16 wherein the connector is flexible.

22. The system of claim 16 wherein the first actuator and the second actuator system comprises vertical electrostatic drives.

23. An optical mirror system comprising:
    an optical surface assembly, the optical surface assembly including a support plate and an optical surface coupled to the support plate;
    a plurality of leg assemblies coupled to the support plate for supporting the optical surface above a substrate, and each of the plurality of leg assemblies includes a rigid leg portion and a connector, the connector coupled between the rigid leg portion and the optical surface;
    a flexible anchor is coupled to the rigid leg portion for coupling the leg portion to the substrate; and
    an actuator coupled to at least one of the leg portions to allow for rotation and translation of the optical surface.

24. The system of claim 23 wherein the actuator comprises parallel plate electrodes.

25. The system of claim 23 wherein the actuator comprises electrostatic drives.

26. The system of claim 23 wherein the actuator comprises vertical electrostatic drives.

* * * * *